US008827749B2

(12) United States Patent
Kim

(10) Patent No.: US 8,827,749 B2
(45) Date of Patent: Sep. 9, 2014

(54) MOUNTING SOCKET FOR MOBILE PHONE

(71) Applicant: Jung-Hoon Kim, Seoul (KR)

(72) Inventor: Jung-Hoon Kim, Seoul (KR)

(73) Assignee: Tyco Electronics Amp Korea Ltd., Kyungsangbuk-Do (KR)

( * ) Notice: Subject to any disclaimer, the term of this patent is extended or adjusted under 35 U.S.C. 154(b) by 0 days.

(21) Appl. No.: 13/683,892

(22) Filed: Nov. 21, 2012

(65) Prior Publication Data

US 2013/0171880 A1 Jul. 4, 2013

(30) Foreign Application Priority Data

Nov. 22, 2011 (KR) .......................... 10-2011-0122389

(51) Int. Cl.
*H01R 24/00* (2011.01)
*G06K 7/00* (2006.01)
*H01R 12/50* (2011.01)
*H01R 27/02* (2006.01)
*H01R 13/24* (2006.01)

(52) U.S. Cl.
CPC .............. *H01R 23/68* (2013.01); *G06K 7/0043* (2013.01); *H01R 27/02* (2013.01); *H01R 13/2442* (2013.01); *G06K 7/0034* (2013.01)
USPC ..................................... 439/629; 439/607.08

(58) Field of Classification Search
CPC ........... H01R 23/7068; H01R 23/7073; H01R 23/725; H01R 23/70; H01R 23/7078; H01R 27/00; H01R 13/2442; H01R 13/635; H01R 23/688; H01R 23/6873; H01R 13/658; H01R 13/65802; H01R 13/518

USPC ......... 439/159, 540.1, 541.5, 607.08, 607.23, 439/607.53, 629, 630
See application file for complete search history.

(56) References Cited

U.S. PATENT DOCUMENTS

| | | | | |
|---|---|---|---|---|
| 6,468,101 B2 * | 10/2002 | Suzuki | ......................... | 439/326 |
| 6,540,523 B1 * | 4/2003 | Kung et al. | ..................... | 439/64 |
| 7,108,558 B2 * | 9/2006 | Zhu et al. | ...................... | 439/630 |
| 7,338,326 B2 * | 3/2008 | Su | .................................. | 439/638 |
| 7,344,416 B2 * | 3/2008 | Quijin | ........................... | 439/630 |
| 7,361,056 B1 * | 4/2008 | Liu | .............................. | 439/630 |
| 7,556,534 B1 * | 7/2009 | Ho | .............................. | 439/630 |
| 7,771,231 B2 | 8/2010 | Kim | | |
| 8,568,174 B2 * | 10/2013 | Liu | .............................. | 439/630 |

* cited by examiner

*Primary Examiner* — Thanh Tam Le
(74) *Attorney, Agent, or Firm* — Barley Snyder

(57) ABSTRACT

A card mounting socket for a mobile phone having a reduced size and reduced number of parts. The card mounting socket having a body and a separate casing. The body housing includes a first receiving section, a second receiving section and an inner wall. The first receiving section is provided with a pair of guides positioned on both sides thereof and a first card terminal disposed along a major surface of the first receiving section. The second receiving section includes a second card terminal disposed along a major surface of the second receiving section. The inner wall extends perpendicular from the first receiving section to the second receiving section such that the second receiving section is stepped with respect to the first receiving section. The separate casing is secured to an upper portion of the body and separates the first receiving section from the second receiving section.

18 Claims, 6 Drawing Sheets

FIGURE 1 - PRIOR ART

MOUNTING SOCKET FOR MOBILE PHONE

CROSS-REFERENCE TO RELATED APPLICATIONS

This application claims the benefit of the filing dates under 35 U.S.C. §119(a)-(d) of Korean Patent Application No. 10-2011-0122389, filed on Nov. 22, 2011.

FIELD OF THE INVENTION

The present invention relates to a card mounting socket and, more particularly, to a card mounting socket for a mobile phone having reduced overall size and a reduced number of parts.

BACKGROUND

Recently, smart phones are being developed and having equipment capable of performing functions such as the Internet communication, data search, and the like that are conventionally carried out by a computer. Therefore, internal memory capacity is undersized and, consequently, a socket is provided to separately mount a memory card in the mobile phone to increase the memory capacity.

To make the mobile phone light, thin, short, and small, a micro secure digital (SD) card having a large memory capacity for size is generally used as the memory card.

In addition, a subscriber identity module (SIM) card, that is an integrated circuit (IC) card implementing a SIM, is conventionally installed in most types of mobile phones. Since the SIM card stores subscriber information, use of another terminal is enabled simply by inserting the SIM card. Also, using the SIM card, electronic commerce may be conveniently performed without dedicated authentication.

Accordingly, a socket is necessary in a mobile phone to mount the SD card and the SIM card.

An example of a known socket for mounting a memory card in a mobile phone is disclosed in KR Patent Laid-open No. 10-2008-0106727, and shown in FIG. 1.

As shown in FIG. 1, the known socket includes a socket body 110 includes a socket body 110 having a card receiving passageway 113 for a SIM card formed therein, a SIM card terminal 114, a SD card terminal 111, a separation board 120, and a card housing 130.

The socket body 110 is made of an insulating material. The SIM card terminal 114 and the SD card terminal 111 are separately disposed along the socket body in up and down direction. The separation board 120 is made of metal and is positioned along an upper portion of the socket body 110 to separate an SD card and the SIM card. The card housing 130 is made of metal to surround an assembly of the socket body 110 and the separation board 120.

The socket for mounting a memory card is configured in such a manner that the SIM card is inserted along a lower portion with respect to the separation board 120, thereby achieving electrical connection between a contact point of the SIM card and the SIM card terminal 114 formed along the socket body 110. In addition, the SD card is inserted from an upper portion, thereby achieving electrical connection between a contact point of the SD card and the SD card terminal 111 formed at the socket body 110.

In the foregoing socket for mounting a memory card, when the SD card is introduced, an upper portion of the SD card, in particular, a position forming a contact with the SD card terminal 114 is opened. Therefore, a card housing 130 to confine the upper portion of the SD card is required to maintain contact between the SD card terminal and the SD card elastically supported upward by the SD card terminal.

However, when the card housing 130 is mounted, a number of parts and a number of processes during assembly are increased. Furthermore, since an entire size is increased, space utilization of an inside of the mobile phone may be reduced.

Furthermore, since the card housing 130 is made of metal, an ambient current may flow into the socket and even damage the card.

In addition, although the SD card and the SIM card are positioned separate from each other, using the separation board 120, insertion and separation of the SD card and the SIM card is performed parallel in upward and downward directions, which causes interference with each other. Therefore, when one of the SD card and the SIM card is taken out, the other may also be separated.

Furthermore, since the SD card and the SIM card are positioned on top of each other, it is difficult to simultaneously remove the SD card and the SIM card along on side surface side of a thin mobile phone.

SUMMARY

Accordingly, a card mounting socket for a mobile phone is provided, having a reduced size and reduced number of parts.

The card mounting socket having a body and a separate casing. The body housing includes a first receiving section, a second receiving section and an inner wall. The first receiving section is provided with a pair of guides positioned on both sides thereof and a first card terminal disposed along a major surface of the first receiving section. The second receiving section includes a second card terminal disposed along a major surface of the second receiving section. The inner wall extends perpendicular from the first receiving section to the second receiving section such that the second receiving section is stepped with respect to the first receiving section. The separate casing is secured to an upper portion of the body and separates the first receiving section from the second receiving section.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE EMBODIMENT(S)

Figure 1:
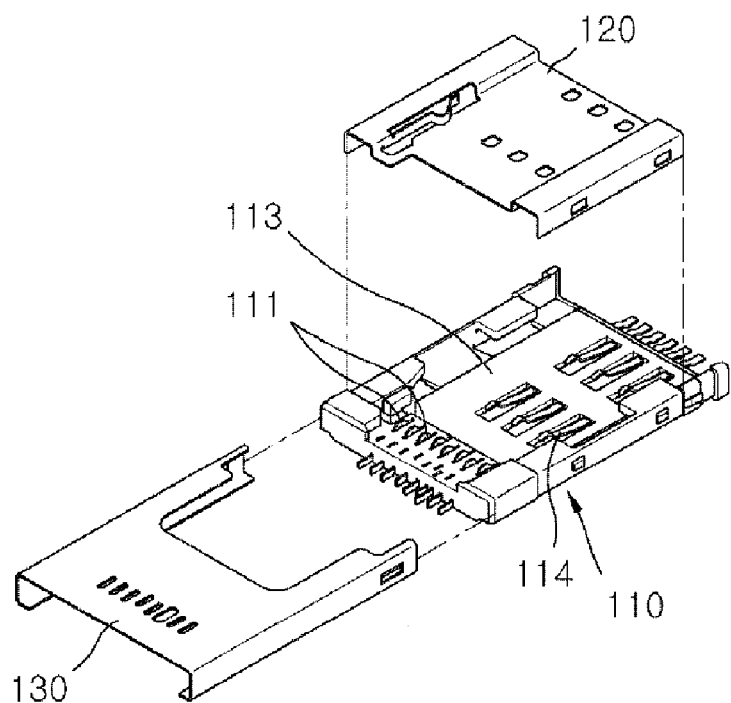
FIG. 1 is an exploded perspective view of a known card mounting socket.

Reference will now be made in detail to a card mounting socket according to exemplary embodiments of the invention, examples of which are illustrated in the accompanying drawings, wherein like reference numerals refer to the like elements throughout.

Figure 2:
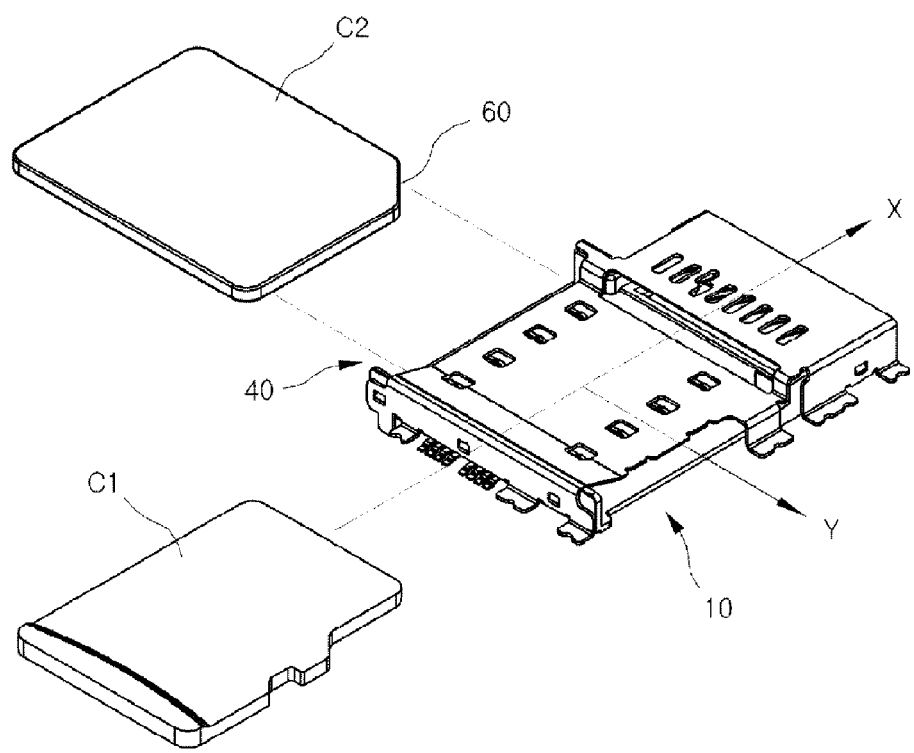
FIG. 2 is a perspective view of a card mounting socket according to the invention.
Figure 3:
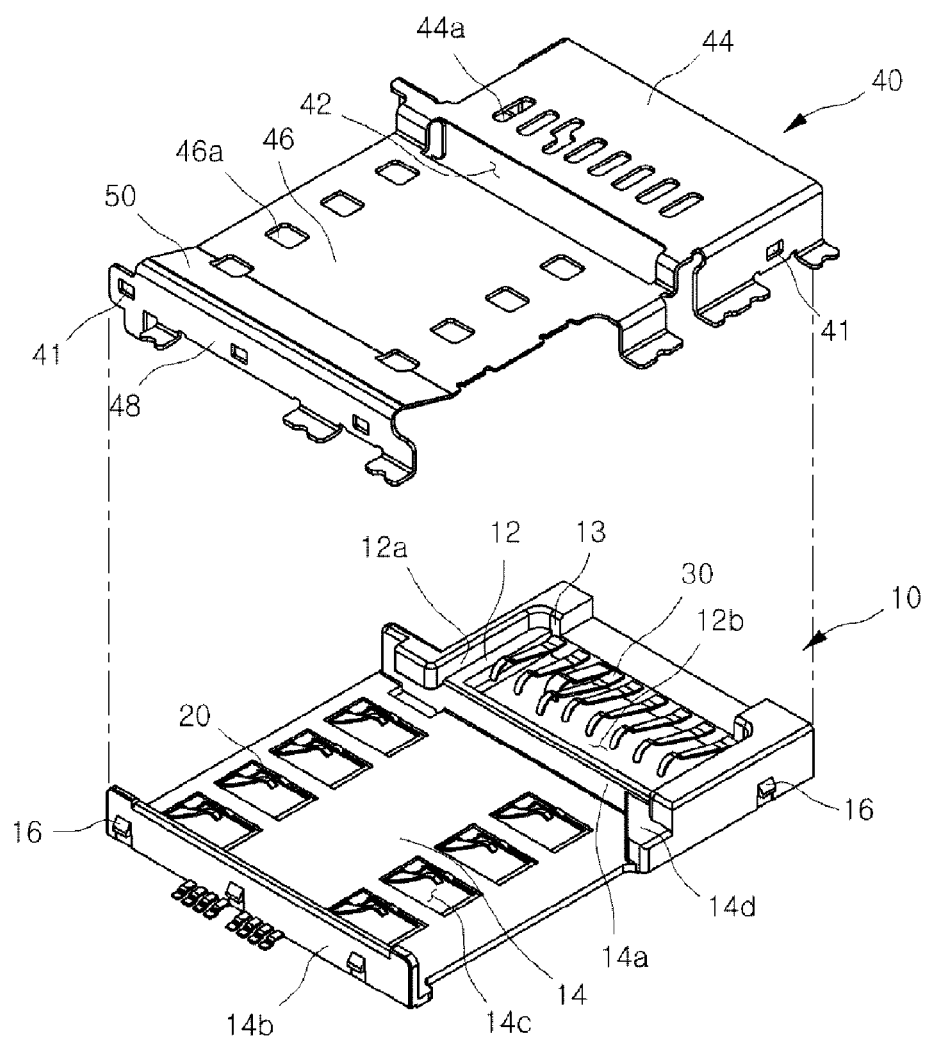
FIG. 3 is an exploded perspective view of the card mounting socket according to the invention.

With reference to FIGS. 2 and 3, a card mounting socket according to the invention includes a body housing 10 having a first receiving section 12 and a second receiving section 14. The first receiving section 12 includes guides 12a disposed on opposite sides respectively, so that a first card C1 is inserted along an x-axis direction in the embodiment shown. The second receiving section 14 is positioned lower the than the first receiving section 12, such that the second receiving section 14 in the embodiment shown is stepped with respect to the first receiving section 12 so that a second card C2 may be inserted along a y-axis direction. A second card terminal 20 is disposed along a surface of the second receiving section 14 to be connected with the second card C2, and a first card terminal 30 is disposed along the first receiving section 12 to be connected with the first card C1. A separate casing 40 is mounted to an upper portion of the body housing 10 and includes a first card receiving passageway 42 formed substantially in a middle for the first card C1 to pass through. As shown in FIG. 2, the x-axis direction and the y-axis direction are orthogonal to each other 2.

According to the shown embodiment, the first card C1 is a secure digital (SD) card and the second card C2 is a subscriber identity module (SIM) card. However, positions of the first card C1 and the second card C2 may be exchanged as necessary. In addition, the first card C1 and the second card C2 may be other types of cards that communicate with a control portion of the mobile phone, besides the SD card or the SIM card.

The body housing 10 may be made of an insulating material. The body housing 10 may include a first receiving section 12 and a second receiving section 14 configured to form a step with respect to the first receiving section 12.

As shown in FIGS. 2 and 3, the first receiving section 12 may include a guide 12a extending parallel with the x-axis direction to guide the first card C1 when being inserted into the first receiving section 12. In addition, the first receiving section 12 may include a first card terminal mounting device 12b for the first card terminal 30 to vertically pass through. Accordingly, the first card terminal 30 mounted upward through the first card terminal mounting device 12b may elastically press a contact point of the first card C1 positioned the guide 12a. In addition, a stopper 13 may be formed along a rear portion of the first receiving section 12, which corresponds to a leading end of the first card C1 to prevent the first card C1 from further advancing past the first card terminal 30.

The second receiving section 14 may form a step with respect to the first receiving section 12 and may include an inner wall 14a connected to the first receiving section 12 and an outer wall 14b formed across the second receiving section 14 and parallel with the inner wall 14a. In the embodiment shown, the second receiving section 14 is receiving space positioned lower than the first receiving section 12. The second receiving section 14 is defined by an inner wall 14a and an outer wall 14b positioned opposite from each other, while the opposing side of the second receiving section 14 are be open so that the second card C2 may be receiving in and out along the y-axis direction. In the embodiment shown, the inner wall 14a extends downward from the first receiving section 12 to a major surface of the second receiving section 14, and the outer wall 14b extends upward from major surface such that the outer wall 14b corresponds with the inner wall 14a to form the second receiving section 14.

A plurality of second card terminal mounting devices 14c may be formed along the major surface of the second receiving section 14 so that the second card terminal 20 may vertically pass through. Therefore, when the second card terminal 20 is positioned on the second card terminal mounting devices 14c, the second card terminal 20 may elastically press a contact point of the second card C2 inserted between the inner wall 14a and the outer wall 14b. Additionally, the second receiving section 14 may include a stopper 14d positioned on one open side, and has a shape corresponding to a chamfered portion 60 formed at a leading end of the second card C2 when the second card C2 is inserted, on the inner wall 14a corresponding to the chamfered portion 60.

The second card terminal 20 may be formed on the floor of the second receiving section 14. A leading end of the second card terminal 20 is contacted and electrically conducted with the contact point with the second card C2. Additionally, another first card terminal 30 may be formed along the major surface of the first card terminal mounting devices 12b of the first receiving section 12. In the embodiment shown, the other first card terminal 30 is positioned along an opposite end of the major surface than the second card terminal 20. A leading end of the first card terminal 30 may contact and electrically connect with the contact point with the first card C1.

In the embodiment shown, the separate casing 40 is mounted to an upper portion of the body housing 10, thereby securing the first card C1 and the second card C2 along the upper portion. The separate casing 40 may include an upper surface portion 44 corresponding to an upper portion of the first receiving section 12 and a lower surface portion 46 forming a step with respect to the upper surface portion 44. The first card receiving passageway 42 is disposed along a surface of the step between the upper surface portion 44 and the lower surface portion 46 to allow insertion of the first card C1.

The upper surface portion 44 is disposed along the upper portion of the first receiving section 12. A height of a gap between the upper surface portion 44 and a major surface of the first receiving section 12 is designed to allow insertion of the first card C1. In addition, the upper surface portion 44 may include a short circuit prevention hole 44a formed a position corresponding to an upper end of the first card terminal 30 to prevent a short circuit that may generate by vibration when the first card C1 is not inserted.

The lower surface portion 46 may be disposed along an upper portion of the second receiving section 14. A height of a gap between the lower surface portion 46 and the major surface of the second receiving section 14 is designed to allow the second card C2 to be inserted between the lower surface portion 46 and the major surface of the second receiving section 14. In addition, the lower surface portion 46 may include a short circuit prevention hole 46a formed at a position corresponding to an upper end of the second card terminal 20 to prevent a short circuit from being generated by vibration when the second card C2 is not inserted. The lower surface portion 46 may include the first card receiving passageway 42 formed at the step with respect to the upper surface portion 44 to allow the first card C1 to pass through. The lower surface portion 46 may further include a vertical plate 48 disposed on a side opposite to the first card receiving passageway 42, and an inclined surface 50 disposed adjacent to the vertical plate 48 to be inclined upward toward the vertical plate 48. Since the inclined surface 50 is inclined upward toward the vertical plate 48, a start point of the inclined surface 50 may function as a support point that prevents the first card C1 once introduced and completely inserted from being separated by vibration.

For connection between the separate casing 40 and the body housing 10, the body housing 10 may include a plurality of projections 16 formed at an outside while the separate casing 40 includes a plurality of projection receiving passageways 41 corresponding to the plurality of projections 16. Therefore, when the separate casing 40 and the body housing 10 are assembled, the plurality of projections 16 and the plurality of projection receiving passageways 41 are engaged with each other, thereby securing connection between the separate casing 40 and the body housing 10.

Hereinafter, an operation of inserting the second card C2 and the first card C1 in the card mounting socket according to the invention is described.

Figure 4:
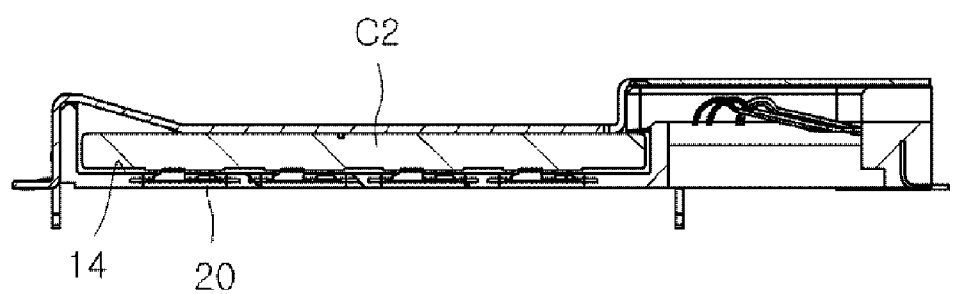
FIG. 4 is a side sectional view of the card mounting socket according to the invention, when a subscriber identity module (SIM) card is inserted into the card mounting socket.

With respect to FIG. 4, the second card C2 is shown, which is inserted in the card mounting socket according to the invention. Likewise, FIG. 5 shows the first card C1 is inserted in the card mounting socket, while in FIG. 6 the second card C2 and the first card C1 are both inserted in the card mounting socket according to the invention.

While inserting the second card C2 into the card mounting socket, the second card C2 is gripped and inserted into the second receiving section 14 from one of the open sides toward the stopper 14*d*, along the y-axis direction. When the second card C2 is positioned in the second receiving section 14, the leading end of the second card C2 is brought into contact with the second card terminal 20. When the second card C2 is further positioned inward, the contact point of the second card C2 is brought into contact with the second card terminal 20 corresponding to the contact point. Therefore, electrical connection is achieved as shown in FIG. 4.

Figure 5:
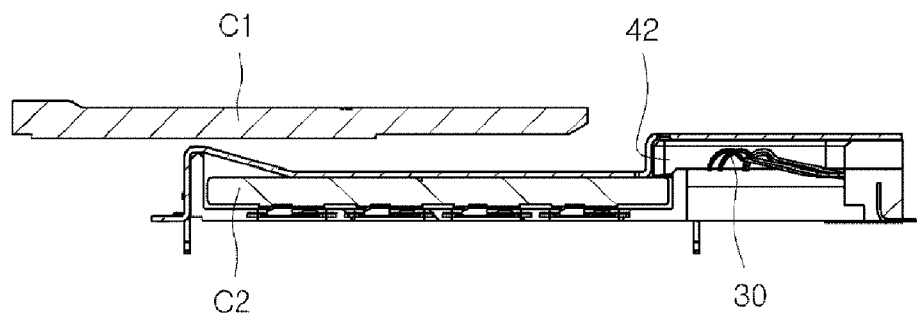
FIG. 5 is a side sectional view of the card mounting socket according to the invention, when a secure digital (SD) card is inserted into the card mounting socket.

Now, when inserting the first card C1, the first card C1 is gripped and positioned into the first card receiving passageway 42, as shown in FIG. 5, along the x-axis direction such that the first card C1 contacts the lower surface portion 46 of the separate casing 40.

Figure 6:
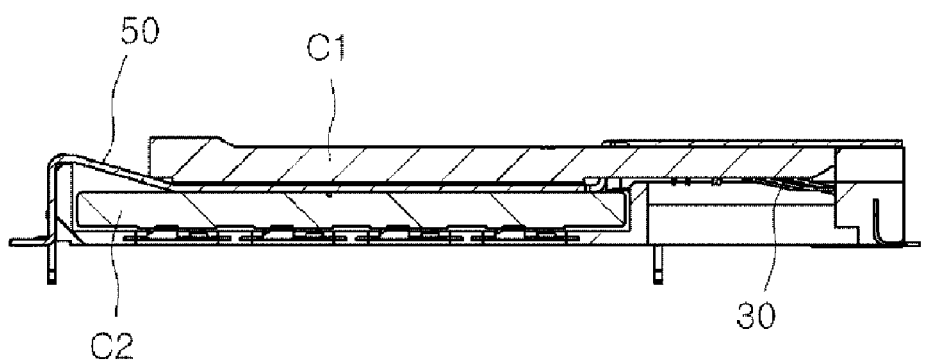
FIG. 6 is a side sectional view of the card mounting socket according to the invention, when a subscriber identity module (SIM) card and a secure digital (SD) card are inserted into the card mounting socket.

When the first card C1 is introduced, the contact point of the first card C1 is brought into contact with the first card terminal 30 corresponding to the contact point. Here, the first card C1 needs to be inserted such that a rear end of the first card C1 completely passes by the start point of the inclined surface 50 as shown in FIG. 6, to be prevented from escaping by vibration.

According to embodiments of the invention, since the card housing is unnecessary, a number of parts and a number of processes during assembly may be reduced, accordingly reducing production cost.

Additionally, according to embodiments of the invention, since the card housing is unnecessary, an entire size of the card mounting socket for a mobile phone may be reduced. Therefore, space utilization of an inside of the mobile phone may be increased.

Additionally, according to embodiments of the invention, since the card housing is unnecessary in the card mounting socket for a mobile phone, damage of the card by an ambient current may be prevented.

Additionally, according to embodiments of the invention, since the first card and the second card are inserted in different directions, the first card and the second card may be conveniently mounted and separated without interfering with each other.

Additionally, according to embodiments of the invention, in the card mounting socket for the mobile phone, since an inclined surface is formed at a rear portion of a lower surface of the separate casing, the first card once inserted may be prevented from being separated by vibration.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A card mounting socket, comprising:
 a body housing having a first receiving section and a second receiving section;
 the first receiving section provided with a pair of guides positioned on both sides thereof, a first card terminal disposed along a major surface thereof, and a first card insertion opening positioned between the pair of guides;
 the second receiving section having a second card terminal disposed along a major surface thereof, an inner wall extending perpendicular from the first receiving section to the second receiving section such that the second receiving section is stepped with respect to the first receiving section, an outer wall formed across the second receiving section and parallel with the inner wall, and a second card insertion opening positioned between the inner wall and the outer wall; and
 a separate casing secured to an upper portion of the body and separating the first receiving section from the second receiving section.

2. The card mounting socket of claim 1, wherein the first card insertion opening and the second card insertion opening are orthogonal to each other.

3. The card mounting socket of claim 1, wherein the separate casing includes an upper surface portion and a lower surface portion forming a step with respect to the upper surface portion.

4. The card mounting socket of claim 3, wherein the separate casing further includes a card receiving passageway formed at the step.

5. The card mounting socket of claim 4, wherein the lower surface portion includes an inclined surface disposed at a rear portion with respect to an insertion direction of the first card insertion passageway and inclined upward.

6. The card mounting socket of claim 4, wherein the lower surface portion includes a short circuit prevention hole formed at a position corresponding to an upper end of the second card terminal.

7. The card mounting socket of claim 4, wherein the lower surface portion includes a vertical plate disposed on a side opposite to the card receiving passageway.

8. The card mounting socket of claim 1, wherein the body housing includes a plurality of projections formed along an outside thereof.

9. The card mounting socket of claim 8, wherein the separate casing includes a plurality of projection receiving passageways corresponding to the plurality of projections.

10. The card mounting socket of claim 1, wherein the second receiving section includes a stopper disposed between the inner wall and the outer wall.

11. A card mounting socket, comprising:
 a body housing having a first receiving section provided with a pair of guides positioned on both sides thereof and a first card terminal disposed along a major surface of the first receiving section, a second receiving section having a second card terminal disposed along a major surface of the second receiving section, and an inner wall extending perpendicular from the first receiving section to the second receiving section such that the second receiving section is stepped with respect to the first receiving section; and
 a separate casing secured to an upper portion of the body, separating the first receiving section from the second receiving section, the separate casing including an upper surface portion, a lower surface portion forming a step with respect to the upper surface portion, and a card receiving passageway formed at the step.

12. The card mounting socket of claim 11, wherein the lower surface portion includes an inclined surface disposed at a rear portion with respect to an insertion direction of the first card insertion passageway and inclined upward.

13. The card mounting socket of claim 11, wherein the lower surface portion includes a short circuit prevention hole formed at a position corresponding to an upper end of the second card terminal.

14. The card mounting socket of claim 11, wherein the lower surface portion includes a vertical plate disposed on a side opposite to the card receiving passageway.

15. The card mounting socket of claim 11, wherein the body housing includes a plurality of projections formed along an outside thereof.

16. The card mounting socket of claim 15, wherein the separate casing includes a plurality of projection receiving passageways corresponding to the plurality of projections.

17. The card mounting socket of claim 11, wherein the second receiving section includes an outer wall formed across the second receiving section and positioned parallel with the inner wall.

18. The card mounting socket of claim 17, wherein the second receiving section includes a stopper disposed between the inner wall and the outer wall.

* * * * *